United States Patent
Lin

(10) Patent No.: US 6,669,418 B1
(45) Date of Patent: Dec. 30, 2003

(54) DEVICE USED TO HOLD A CARGO-LOCATING ROPE IN A FREIGHT

(76) Inventor: Chia-Sheng Lin, 114, Sec. 1, Yung Po Rd., Pun Hsin Hsiang, Chang Hua Hsien (TW)

( * ) Notice: Subject to any disclaimer, the term of this patent is extended or adjusted under 35 U.S.C. 154(b) by 0 days.

(21) Appl. No.: 10/162,346

(22) Filed: Jun. 5, 2002

(51) Int. Cl.[7] .................................................. B60P 7/08
(52) U.S. Cl. ..................... 410/107; 410/110; 410/111; 410/116
(58) Field of Search ............................... 410/101, 106, 410/107, 110, 111, 116; 24/265 CD, 115 K

(56) References Cited

U.S. PATENT DOCUMENTS

| | | | | |
|---|---|---|---|---|
| 2,729,417 A | * | 1/1956 | Maynard | |
| 5,444,897 A | * | 8/1995 | Gross | 410/107 |
| 5,971,684 A | * | 10/1999 | Wang | 410/107 |
| 6,231,285 B1 | * | 5/2001 | Elwell et al. | 410/107 |
| 6,374,466 B1 | * | 4/2002 | Macias | 410/107 |
| 6,464,437 B1 | * | 10/2002 | Elwell | 410/107 |
| 6,533,512 B2 | * | 3/2003 | Lin | 410/106 |
| 6,565,301 B1 | * | 5/2003 | Lin | 410/107 |
| 2003/0039526 A1 | * | 2/2003 | Yuan | 410/107 |

* cited by examiner

*Primary Examiner*—Joseph D. Pape
*Assistant Examiner*—H. Gutman
(74) *Attorney, Agent, or Firm*—Harrison & Egbert

(57) ABSTRACT

A device is mounted in the deck of a truck for catching a cargo-locating rope and is formed of a base, a top plate, and a rope-catching plate. The base is mounted in a mounting hole of the deck. The top plate is fastened with the top of the base. The rope-catching plate is slidably located in a receiving slot of the base such that the locating balls of the rope-catching plate are retained in first locating recesses of guide grooves of the base at the time when the rope-catching plate is pulled out of the base to catch the cargo-locating rope. When the rope-catching plate is pushed back into the base, the locating balls of the rope-catching plate move along the guide grooves to locate in second locating recesses of the guide grooves.

1 Claim, 5 Drawing Sheets

DEVICE USED TO HOLD A CARGO-LOCATING ROPE IN A FREIGHT

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to freight equipment, and more particularly to a device which is designed to securely hold a cargo-locating rope.

BACKGROUND OF THE INVENTION

As illustrated in FIG. 1, a load of goods is carried on the deck 06 of a truck 05 such that the load is located by a rope "B" which is firmly held by a plurality of devices "A". The devices "A" are mounted on the deck 06 such that they are raised above the surface of the deck 06. As a result, the devices "A" are susceptible to damage by impact.

BRIEF SUMMARY OF THE INVENTION

The primary objective of the present invention is to provide a cost-effective device which is designed to hold securely a cargo-locating rope in the course of freight and is free of the deficiency of the prior art device described above.

In keeping with the principle of the present invention, the foregoing objective of the present invention is attained by a device comprising a base, a top plate, and a rope-catching plate. The base is mounted in the deck of a truck or the like and is provided in the interior with a retaining slot in which the rope-catching plate is slidably located in conjunction with a plurality of springs and balls.

The features and the advantages of the present invention will be more readily understood upon a thoughtful deliberation of the following detailed description of the present invention with reference to the accompanying drawings.

DETAILED DESCRIPTION OF THE INVENTION

Figure 1:
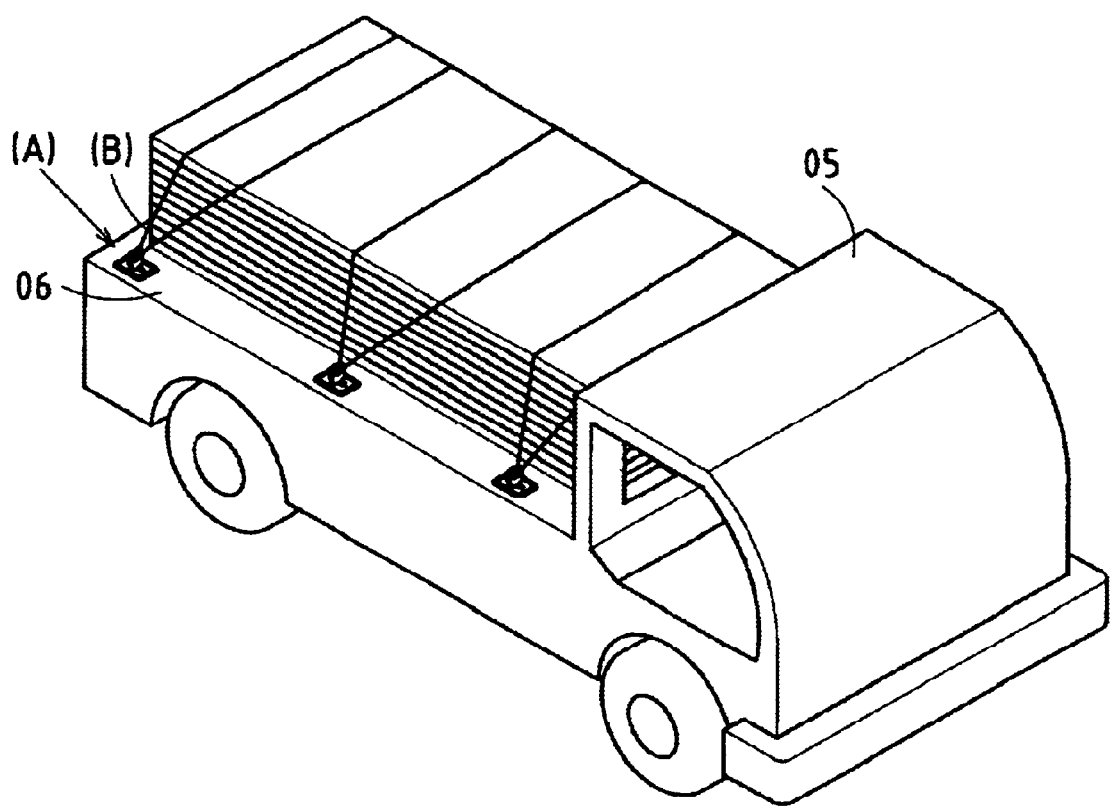
FIG. 1 shows a schematic view of a load of goods carried by a truck.
Figure 2:
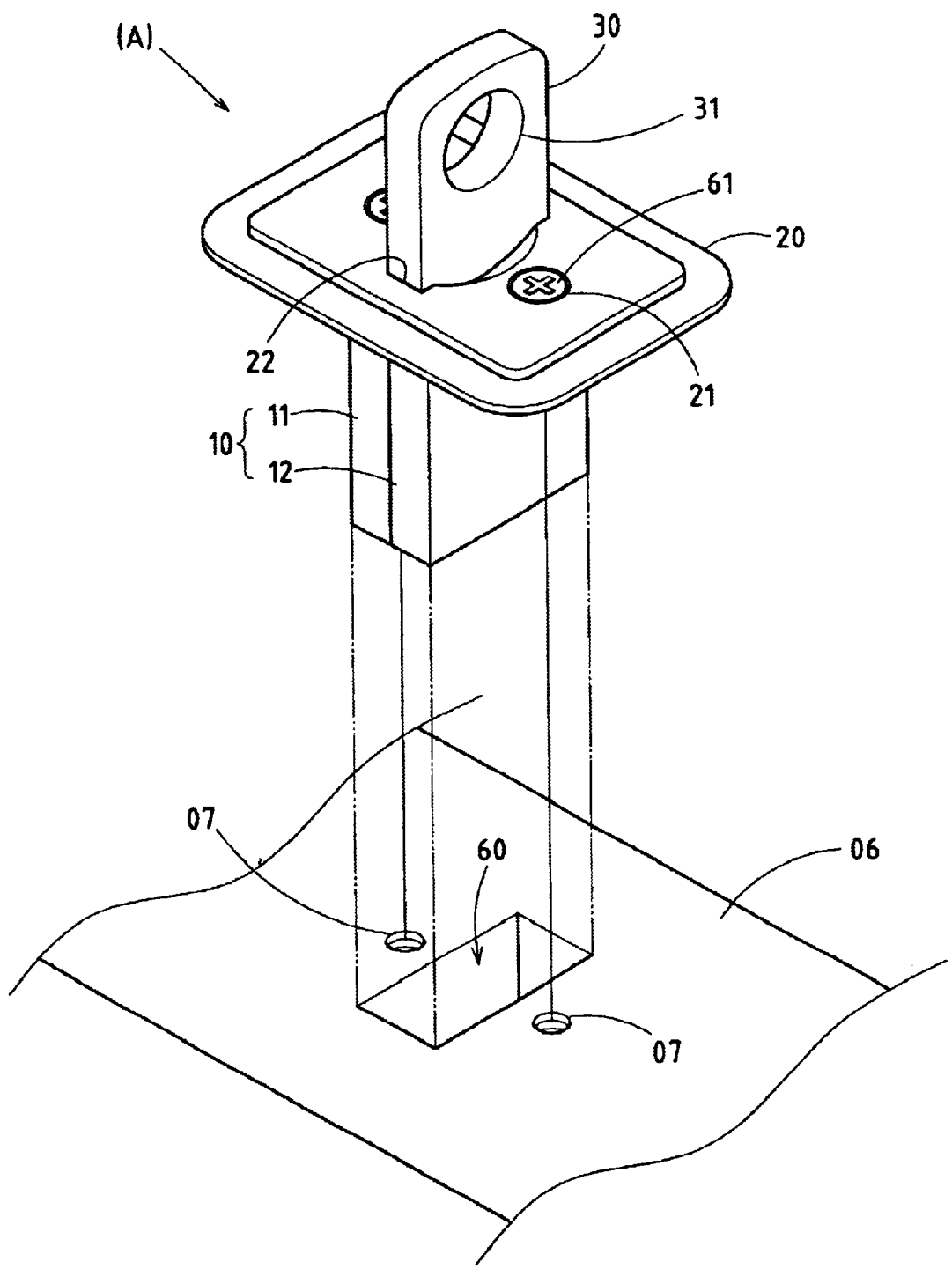
FIG. 2 shows a perspective view of the present invention.
Figure 3:
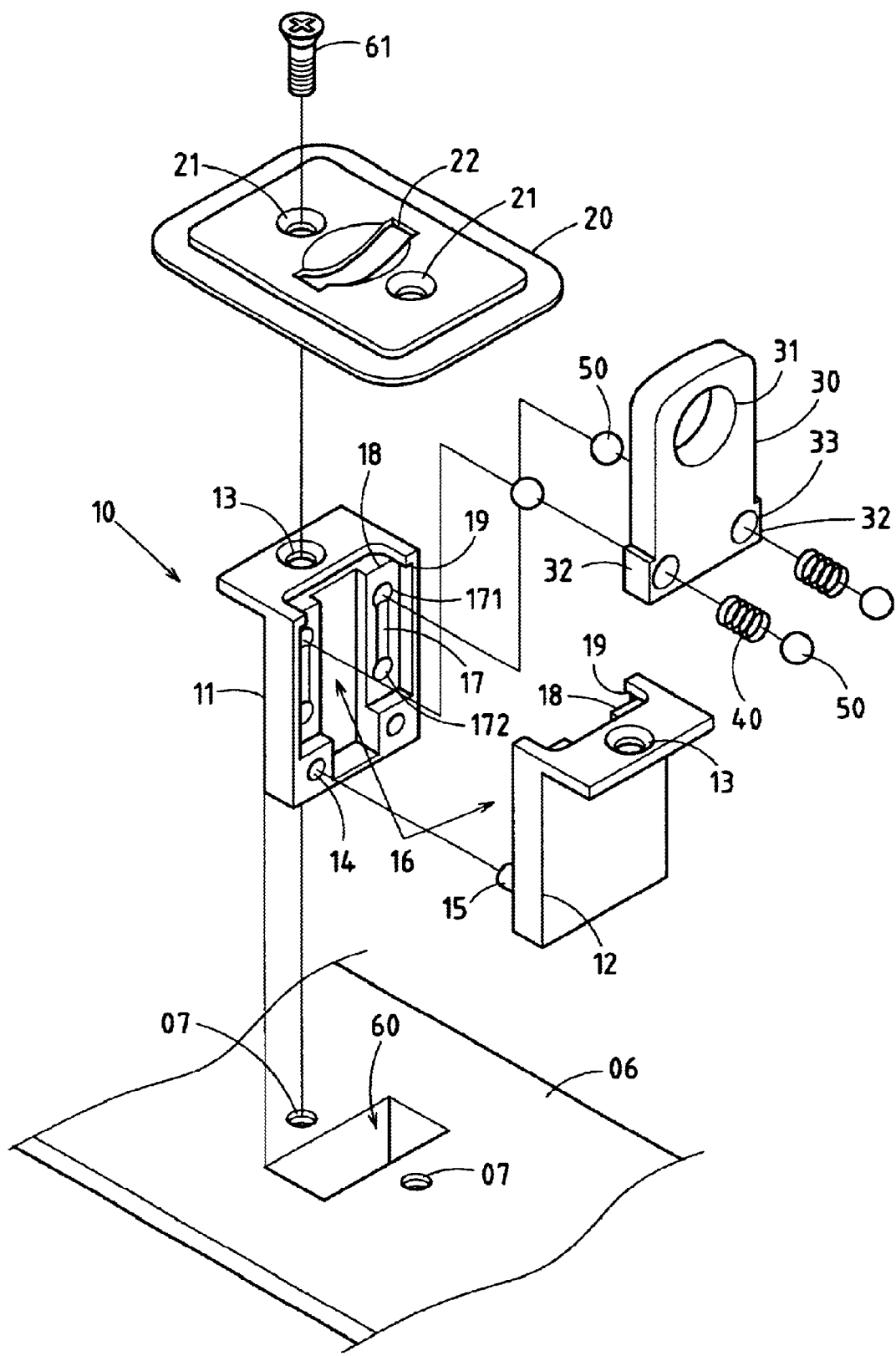
FIG. 3 shows an exploded perspective view of the present invention.

As shown in FIGS. 1–7, a device "A" embodied in the present invention comprises a base 10, a top plate 20, and a rope-catching plate 30.

The base 10 is formed of a first base member 11 and a second base member 12, which are provided in the top with a fastening hole 13. The first base member 11 is provided in the bottom of the inner side thereof with two retaining slots 14, whereas the second base member 12 is provided in the bottom of the inner side thereof with two retaining projections 15 corresponding in location to the retaining slots 14 of the first base member 11. The first base member 11 and the second base member 12 are provided in the interior with a receiving slot 16 and two guide grooves 17 between which the receiving slot 16 is located. The guide grooves 17 are provided at two longitudinal ends with a first locating recess 171 and a second locating recess 172. The recesses 171 and 172 are semispherical in shape. The first base member 11 and the second base member 12 are provided in the top with an opening 18 which is provided with two arresting edges 19.

The top plate 20 is provided with two fastening holes 21 corresponding in location to the two fastening holes 13 of the base 10. Located between the two fastening holes 21 is a through hole 22 corresponding in shape and size to the two openings 18 which are joined together.

The rope-catching plate 30 is provided with a through hole 31 and two protruded edges 32 located at two opposite ends of the bottom side thereof. The rope-catching plate 30 is further provided with two retaining holes 33 and two springs 40 which are retained in the two retaining holes 33.

In combination, the rope-catching plate 30 is slidably located in the receiving slots 16 of the first base member 11 and the second base member 12 in conjunction with a plurality of balls 50 which are located between the springs 40 and the guide grooves 17 of the base 10. The first base member 11 and the second base member 12 are joined together such that the retaining projections 15 of the second base member 12 are retained in the retaining slots 14 of the first base member 11. The device of the present invention is securely mounted on the deck 06 of a truck 05 by two fastening screws 61 which are engaged with two threaded holes 07 of the deck 06 via the two fastening holes 21 of the top plate 20 and the two fastening holes 13 of the base 10, with the base 10 being located in a mounting hole 60 of the deck 06. The top plate 20 is fastened to the top of the base 10 such that the top of the rope-catching plate 30 juts out via the through hole 22 of the top plate 20.

Figure 4:
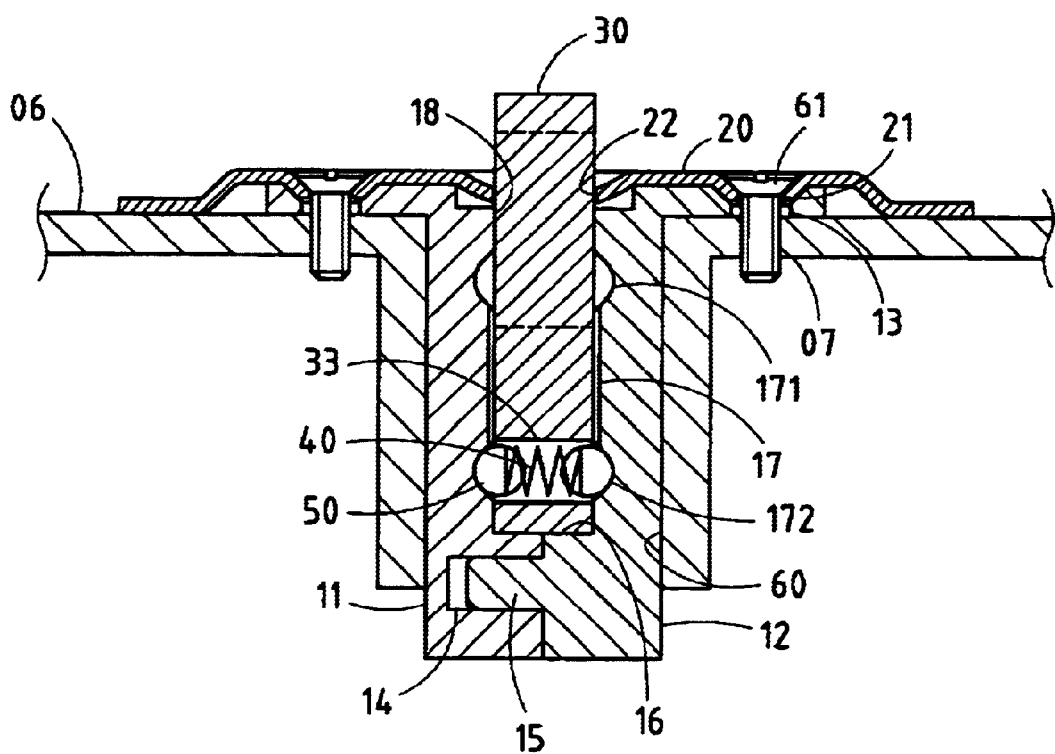
FIG. 4 shows a sectional schematic view of the present invention with the rope-catching plate thereof being in the state of concealment.
Figure 5:
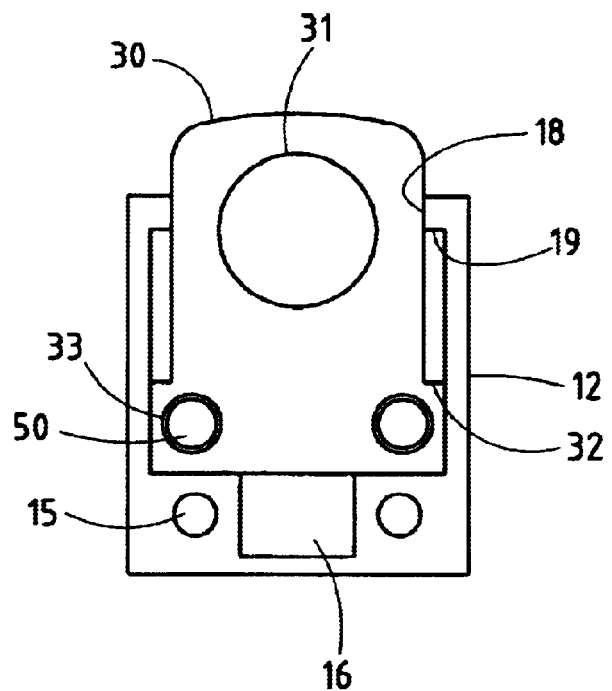
FIG. 5 shows another sectional schematic view of the present invention with the rope-catching plate thereof being in the state of concealment.
Figure 6:
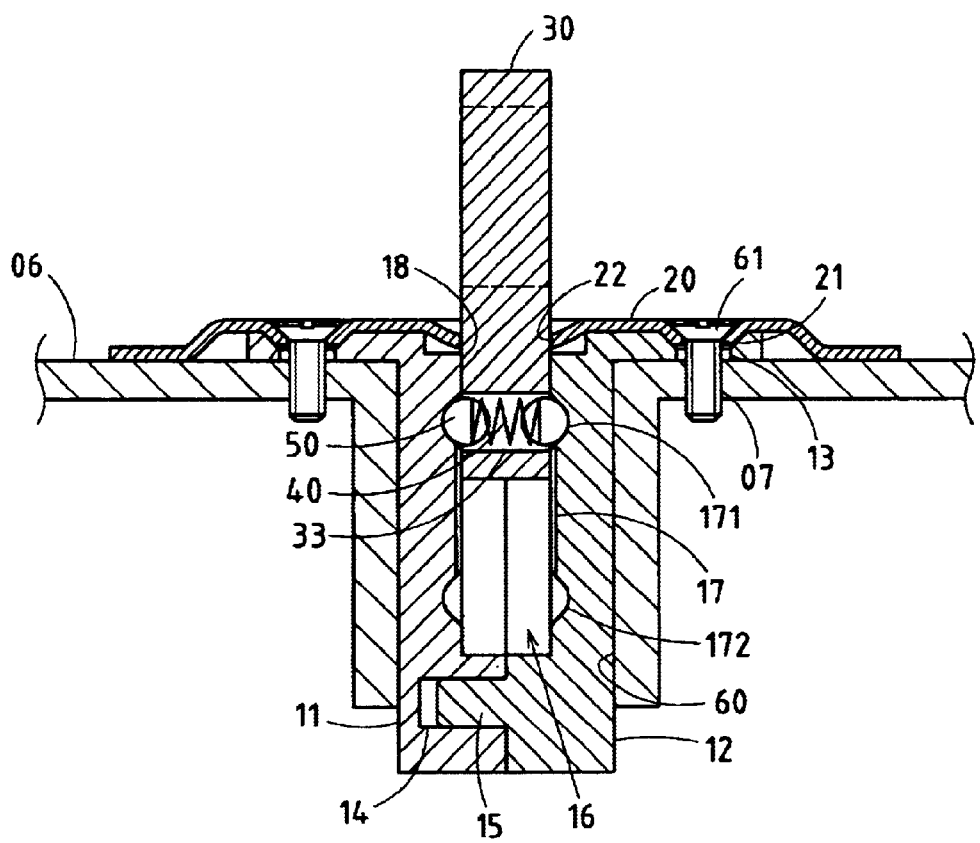
FIG. 6 shows a sectional schematic view of the present invention in the standby state.
Figure 7:
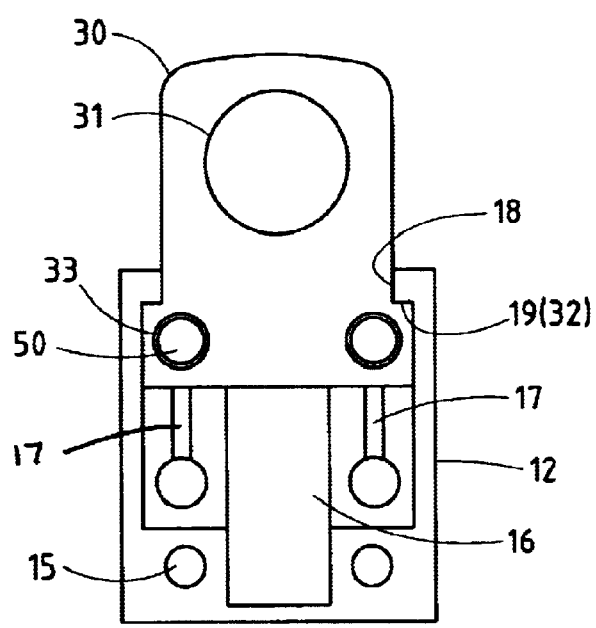
FIG. 7 shows another sectional schematic view of the present invention on standby.

As shown in -FIGS. 4 and 5, the rope-catching plate 30 is not in use such that the rope-catching plate 30 is located in the receiving slots 16 of the base 10 by two balls 50 which are retained in the second locating recesses 172 of the base 10. As the rope-catching plate 30 is slid upwards in the receiving slots 16 of the base 10, the balls 50 move along the guide grooves 17 to locate in the first locating recesses 171, as shown in FIG. 6. In the meantime, the protruded edges 32 of the bottom side of the rope-catching plate 30 are arrested by the arresting edges 19 of the base 10, as shown in FIG. 7. The rope-catching plate 30 is thus ready to serve to catch a cargo-locating rope "B" which is put through the through hole 31.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claim.

I claim:

1. A device for holding a cargo-locating rope comprising:
   a deck of a truck, said deck having a mounting hole and a plurality of threaded holes therein;

a base having a plurality of fastening holes formed in a top thereof, said base having an opening with a plurality of arresting edges, said base having a receiving slot and a plurality of guide grooves in an interior thereof, each of said plurality of guide grooves having a first locating recess at an upper end thereof and a second locating recess at a lower end thereof;

a top plate having a through hole and a plurality of fastening holes, said plurality of fastening holes of said top plate corresponding in location to said fastening holes of said base; and a rope-catching plate having a rope-catching hole in an upper end thereof and a plurality of protruded edges and retaining holes in an lower end thereof, each of said retaining holes having a spring and a pair of locating balls, said pair of locating balls being resiliently urged by respective opposite ends of said spring, said base being positioned in said mounting hole of said deck, said top plate being fastened to said top of said base by a plurality of fastening screws which are respectively engaged with said plurality of threaded holes of said deck via said plurality of fastening holes of said top plate and said plurality of fastening holes of said base, said rope-catching plate being slidably located in said receiving slot of said base, said upper end of said rope-catching plate being jutted out of said base via said opening of said base and said through hole of said top plate, said pair of locating balls being movably located in said plurality of guide grooves of the interior of said base such that the locating balls are located in said first locating recess when said rope-catching plate is slid upward such that said protruded edges at said lower end of said rope-catching plate are arrested by said plurality of arresting edges of said base, said locating balls being movable along said guide grooves to locate in the second locating recesses of said guide grooves when said rope-catching plate is slid downward in said receiving slot of said base.

* * * * *